(12) United States Patent
Gao et al.

(10) Patent No.: US 12,551,198 B2
(45) Date of Patent: Feb. 17, 2026

(54) AUTOMATED SYSTEM FOR QUANTITATIVE COLLECTION AND EXTRACTION OF A FECAL SAMPLE

(71) Applicants: EPITOPE BIOTECHNOLOGY CO., LTD., Jiaxing (CN); EPITOPE DIAGNOSTICS, INC., San Diego, CA (US)

(72) Inventors: Ping Gao, San Diego, CA (US); Qun Gao, Jiaxing (CN); Dongfeng Wang, Jiaxing (CN)

(73) Assignees: Epitope Diagnostics, Inc., San Diego, CA (US); Epitope Biotechnology Co., Ltd, Jiaxing (CN)

( * ) Notice: Subject to any disclaimer, the term of this patent is extended or adjusted under 35 U.S.C. 154(b) by 0 days.

(21) Appl. No.: 19/025,864

(22) Filed: Jan. 16, 2025

(65) Prior Publication Data
US 2025/0228531 A1 Jul. 17, 2025

Related U.S. Application Data

(60) Provisional application No. 63/621,760, filed on Jan. 17, 2024.

(51) Int. Cl.
*A61B 10/00* (2006.01)
*B01L 1/00* (2006.01)
(Continued)

(52) U.S. Cl.
CPC ............ *A61B 10/0038* (2013.01); *B01L 1/50* (2013.01); *G01N 35/00603* (2013.01);
(Continued)

(58) Field of Classification Search
CPC . A61B 10/0038; B01L 1/50; G01N 35/00603; G01N 35/00623;
(Continued)

(56) References Cited

U.S. PATENT DOCUMENTS 11,293,839 B2   4/2022   Gao
2006/0188939 A1  8/2006  Gao
(Continued)

FOREIGN PATENT DOCUMENTS

EP    1645218 A1      4/2006
JP    2017106797 A  *  6/2017

OTHER PUBLICATIONS

International Search Report and Written Opinion for PCT/US2025/011595 mailed Mar. 19, 2025.

*Primary Examiner* — John Mcguirk
(74) *Attorney, Agent, or Firm* — Biotech Beach Law PC; Raymond Wagenknecht

(57) ABSTRACT

Automated systems and methods for the quantitative collection and extraction of a fecal sample, the system including: a primary loading module configured to receive a plurality of primary stool specimen containers, and a secondary loading module configured to receive a plurality of secondary extraction tubes, each with a collection wand; a robotic arm for loading stool on the wand and inserting the stool-loaded wand into the extraction tube; a quality control module configured to assess and confirm whether loading of the collection wand meets a preset acceptable tolerance and if so, assisting with positioning of the robotic arm for accurate insertion of the stool loaded wand into the selected extraction tube; an exhaust module; and executable software loaded into the system and in communication with a database that pairs the primary stool specimen container with a corresponding secondary extraction tube(s).

20 Claims, 11 Drawing Sheets

(51) Int. Cl.
*G01N 33/483* (2006.01)
*G01N 35/00* (2006.01)

(52) U.S. Cl.
CPC ... *G01N 35/00623* (2013.01); *G01N 35/0099* (2013.01); *G01N 33/4833* (2013.01); *G01N 2035/00188* (2013.01); *G01N 2035/00287* (2013.01)

(58) Field of Classification Search
CPC .......... G01N 35/0099; G01N 33/4833; G01N 2035/00188; G01N 2035/00287
See application file for complete search history.

(56) References Cited

U.S. PATENT DOCUMENTS

| | | |
|---|---|---|
| 2019/0011462 A1 | 1/2019 | Shimada et al. |
| 2019/0234843 A1 | 8/2019 | Capps et al. |
| 2022/0167950 A1 | 6/2022 | Nichols et al. |

* cited by examiner

AUTOMATED SYSTEM FOR QUANTITATIVE COLLECTION AND EXTRACTION OF A FECAL SAMPLE

CROSS-REFERENCE TO RELATED APPLICATIONS

This application claims the benefit of priority to U.S. patent application No. 63/621,760, filed Jan. 17, 2024, the content of which is herein incorporated by reference in its entirety.

TECHNICAL FIELD

The invention relates generally to biological sample collection and extraction systems and more specifically to automated methods for the quantitative collection and extraction of a fecal sample.

BACKGROUND OF THE INVENTION

Fecal sample testing is useful in detecting, diagnosing, and monitoring a variety of diseases. For example, fecal occult blood (FOB) tests allow the detection of unapparent bleeding beforehand, which may be an early sign of colonrectal cancer, polyps, or inflammatory bowel disease such as Crohn's disease, colitis ulcer, etc. Fecal *H. pylori* antigen tests can help diagnose active infections of *H. pylori* and monitor the effectiveness of treatment. Other fecal pathogen tests, such as the detection of specific antigens of rotavirus, adenovirus, *Giardia lamblia, Cryptosporidiun parvum, Entamoaba histolytica*, etc. are useful in disease diagnosis and monitoring the effectiveness of treatment. Fecal pancreas elastase-1 tests or a fecal chymotrypsin tests may aid in the diagnosis of pancreas excretory function.

While some tests are qualitative to merely detect the presence or absence of an analyte, others are quantitative to assess the abundance or concentration of analyte. These quantitative tests rely on delivering precise amounts of sample to the testing assay.

U.S. Pat. No. 11,293,839 by Gao discloses one such device for the quantitative extraction of a fecal sample for subsequent testing. The Gao device is a secondary extraction system intended for use by laboratory technicians after receiving a stool specimen provided by the subject or patient in a primary stool specimen container. The Gao device pairs a grooved wand with an elastic sealing funnel having an elongated elastic stem. Stool is collected within the grooves of the wand, and when inserted through the elastic stem, feces outside of the grooves is wiped away. Accordingly, the accuracy of the device primarily relies on the grooves begin properly loaded, and the wand being properly inserted into the elastic sealing funnel. The collected sample can be further extracted via procedures such as vortex mixing or shaking before retrieving a sample for testing. While it would be desirable to automate the process for the secondary collection procedure, one of the most frequent challenges associated with proper loading and transfer is that the consistency of stool within the primary specimen container varies. For example, stool within the primary specimen container that is too dry can be difficult to load into the grooves, and stool that is too wet can be difficult to maintain within and fill the grooves. Therefore, the device is conventionally operated by hand to permit close inspection of the stool loading and to ensure accurate transfer into the elastic stem. However, hand operation and close inspection inherently subject the technician to foul odors. Moreover, exposure can cause nausea or a queasy feeling. Environmentally, the secondary extraction step may contaminate the surrounding laboratory air, causing a potential risk of odor and exposure to microbes. Thus, this secondary extraction step is often performed under an exhausting hood, which adds further limitations to its adoption.

Accordingly, there remains a need for an automated system that permits the quantitative collection and extraction of a fecal sample, which properly assesses the loading of stool on a collection wand, assists with accurate sample transfer into an extraction tube, and minimizes foul odors in the vicinity of its operation without an exhausting hood.

BRIEF SUMMARY OF THE INVENTION

The above challenges have been overcome through the development of an automated system for the quantitative collection and extraction of a fecal sample, having a quality control module that analyzes the quality of stool load and assists with the insertion of a stool-loaded wand into an extraction tube, and having an exhaust module with fan and odor filter that removes odor from the system and minimizes the risk of contaminating the surrounding laboratory air environment.

More specifically, the invention provides automated systems and their use for the quantitative collection and extraction of a fecal sample, including a primary loading module configured to receive a plurality of primary stool specimen containers, each container configured to house a stool specimen, and a secondary loading module configured to receive a plurality of secondary extraction tubes, each tube having a collection wand and configured to quantitatively extract a fecal sample from a stool loaded wand.

The system has a robotic arm, which is configured to open and close a selected primary stool specimen container, selectively retrieve the collection wand from each of the plurality of extraction tubes, insert the retrieved collection wand into the stool to load the wand with stool, and insert the stool loaded collection wand into the selected extraction tube to extract the fecal sample.

Preferably, the collection wand is integrated into an extraction tube cap but in other embodiments, it is separate from the cap.

Preferably, the robotic arm is configured to move the selected extraction tube from the secondary loading module to an operational spot before retrieving the collection wand, but in other embodiments, the selected extraction tube remains in the secondary loading module during fecal sample collection and extraction.

In some embodiments, the wand has cutouts, grooves, and/or through bores, and the plurality of secondary extraction tubes are configured to selectively accept the fecal sample from within the cutouts, grooves and/or through bores. In some embodiments, excess feces is wiped away as the stool-loaded wand is inserted into the selected extraction tube. Wiping can be performed by inserting a stool-loaded wand into an elastic funnel that wipes away excess feces.

Preferably, the robotic arm is configured to load the wand using a downward spiral maneuver. In other embodiments, the wand is lowered and moved in a different motion, such as an orbital motion.

The system also has a quality control module, which includes an analyzer with a feedback mechanism in communication with the robotic arm. The quality control module is configured to assess and confirm whether the loading of the collection wand meets a preset acceptable tolerance, and if so, the quality control system assists with positioning the robotic arm for accurate insertion of the stool-loaded wand into the selected extraction tube.

In some embodiments, the acceptable tolerance is a sufficient amount of loaded stool and in further embodiments, a sufficient consistency of loaded stool is also required. In further embodiments, the system is configured to generate a warning signal and reload the wand if the quality control module does not confirm that the loading of the collection wand meets the acceptable tolerance.

In some embodiments, the quality control module determines the pitch or an offset position of the stool-loaded wand and, if outside of a preset tolerance, instructs an adjustment or modification of pitch or offset position to the robotic arm for the accurate insertion into the extraction tube. Accurate insertion will most often require the extraction tube and stool-loaded collection wand to be aligned so that the collection wand is directly above the extraction tube and in alignment with the extracting structure.

In some embodiments, the analyzer of the quality control module includes a camera and image detection system. In other embodiments, the analyzer includes a laser and photodetector.

The system also includes an exhaust module, which includes a fan and odor filter that removes odor from the system. Preferably, the odor filter includes a filter media such as activated charcoal, baking soda, polyethylene terephthalate (PET), volcanic ash, and chemically treated fabrics.

An air inlet is also included that coordinates with the exhaust module to generate airflow through the system and the odor filter. In some embodiments, the air inlet is configured to selectively remain open while the fan is operated, but in other embodiments, the fan is configured to selectively operate while the air inlet remains open. In such embodiments, the air inlet and an air outlet coordinate with each other to create a mini-air flow within the system to transport the odor to the filter. In some embodiments, opening the door to the system also triggers the start of the fan.

The system is loaded with executable software in communication with a database that pairs the primary stool specimen container with a corresponding secondary extraction tube(s). In some embodiments, the executable software also has a random generator to randomly pair one or more of the plurality of extraction tubes to one or more of the plurality of primary stool specimen containers for further security.

In some embodiments, the system is configured to permit loading of additional primary and secondary loading modules while the robotic arm is transferring stool to extraction tube(s). This permits operating technicians or additional robotic modules to continually feed the system with specimen containers and extraction tubes.

In some embodiments, one or more selected from a) the primary loading module, b) the secondary loading module, c) each of the plurality of primary stool specimen containers, and d) each of the plurality of secondary extraction tubes are labeled with a distinct identifier. Exemplary identifiers can be a barcode, a radio frequency identification (RFID) tag, a near field communication (NFC) tag, or others.

Any two or more of the above optional features can be combined within the system. As such, an exemplary automated system for quantitative collection and extraction of a fecal sample, can include: a primary loading module configured to receive a plurality of primary stool specimen containers, each container configured to house a stool specimen, and a secondary loading module configured to receive a plurality of secondary extraction tubes, each tube having a collection wand integrated into a cap and configured to quantitatively extract a fecal sample from a stool loaded wand; a robotic arm configured to: open and close a selected primary stool specimen container, move a selected extraction tube from the secondary loading module to an operational spot, open the cap and retrieve the collection wand from the selected extraction tube, insert the retrieved collection wand into the stool using a downward spiral maneuver to load the wand with stool, and insert the loaded collection wand into the individual extraction tube to extract the fecal sample; a quality control module having a camera and image detection system with feedback mechanism in communication with the robotic arm that is configured to assess and confirm whether loading of the collection wand meets a preset acceptable tolerance and if so, the quality control module assists with positioning of the robotic arm for accurate insertion of the stool loaded wand into the selected extraction tube, but if not, the system is configured to reload the wand; an exhaust module having a fan and odor filter that removes odor from the system, the system further having an air inlet that coordinates with the exhaust module to generate air flow through the system and the odor filter; and executable software loaded into the system and in communication with a database that randomly generates and assigns pairs between the primary stool specimen container and at least one of the plurality of secondary extraction tube(s).

In related aspects of the invention, methods for quantitative collection and extraction of a fecal sample are provided, which include providing any one of the disclosed systems with or without optional features; adding a stool specimen container that contains stool to the system; and retrieving one or more extraction tubes having the extracted fecal sample. Preferably, the system can run nonstop in that additional primary and secondary loading modules can be loaded while the robotic arm is transferring stool to extraction tube(s). This permits operating technicians or robotic modules to continually feed the system with specimen containers and extraction tubes, and in addition, remove extraction tubes having the extracted fecal sample.

BRIEF DESCRIPTION OF DRAWINGS

Embodiments of the invention can be better understood with reference to the following drawings, which form part of the specification and represent preferred embodiments at the time of filing. The components in the drawings are not necessarily to scale, emphasis instead being placed upon illustrating the principles of the invention. And, in the drawings, like reference numerals designate corresponding parts throughout the several views

DETAILED DESCRIPTION OF THE INVENTION

Figure 1:
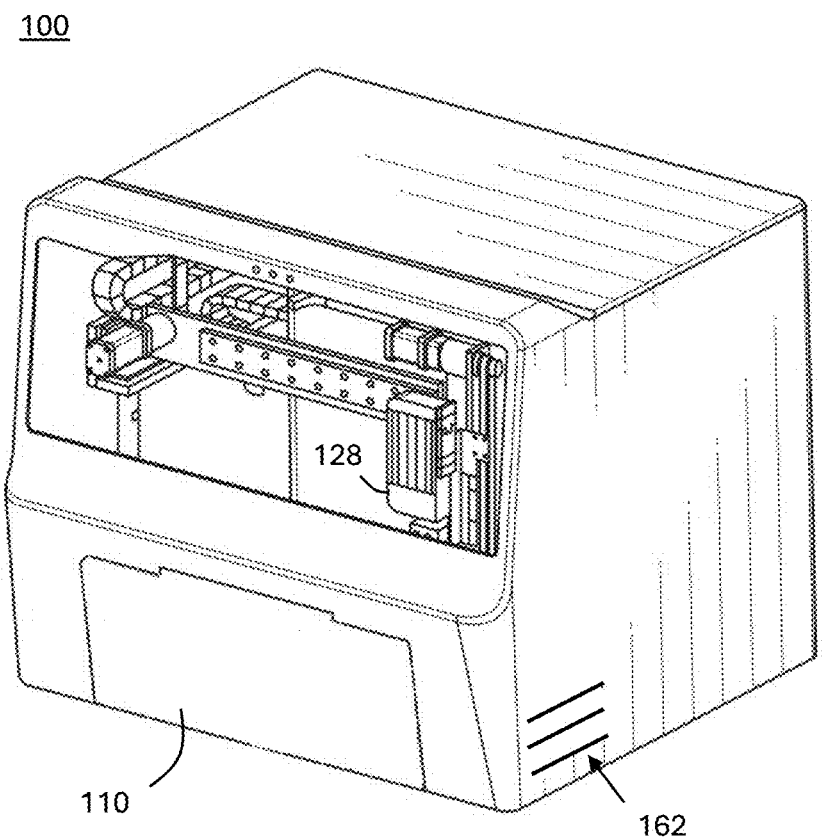
FIG. 1 depicts an exemplary automated system shown in a bench top configuration with its loading door and an air inlet.

What is disclosed is automated systems and methods for the quantitative collection and extraction of a fecal sample from a specimen of stool. As used herein, the term "quantitative collection and extraction" means that the systems and methods deliver a predetermined, fixed sample volume from a larger specimen volume. Accordingly, the invention can be paired with quantitative assays for the measurement of fecal analytes or components.

Thus, among the benefits of the invention are that fecal samples can be quantitatively collected and extracted in high throughput. However, achieving high throughput collection and extraction of fecal samples required more than merely automating a physical process. That is, additional challenges had to be overcome for high throughput automation. Among these include quality control mechanisms that account for the inconsistencies found in stool specimens. Because there are inconsistencies found in stool specimens, such as samples that are too hard and those that are too soft for certain sample extraction methodologies used for quantitative analysis, further improvements had to be developed to act as checkpoints to assess sample load prior to fecal sample extraction.

It was also found that when automating the stool collection process using a collection wand, in some instances the wand can be deflected or become offset compared to its initial alignment and thus solutions had to be developed to on the one hand analyze the amount of deflection or offset positioning of the wand and on the other hand adjust the alignment of a deflected or offset wand for proper reinsertion into the extraction tube for quantitative extraction.

Still further, it was also found that even when accounting for the above, as throughput increased in the automated system, a foul odor also increased, whether by increasing the throughput of exposure to feces or by the movement of automated parts to waft the odor into the local environment. It was especially found that after processing many specimens, when opening the door of test systems, the technician would be exposed to a cloud of foul odor.

The inventions described herein have solved each of the above challenges. In particular, beginning with FIGS. 1-2, the above challenges have been solved in an automated system 100 for quantitative collection and extraction of a fecal sample. Moreover, the system 100 has been miniaturized into a benchtop model, thereby minimizing the required space in a laboratory or testing facility.

For clarity of disclosure, and not by way of limitation, the system 100 is discussed according to different detailed embodiments; however, the skilled artisan will recognize that features of one embodiment can be combined with other embodiments and is therefore within the intended scope of the invention.

The system 100 includes at least one but preferably, a plurality of primary loading modules 102, each configured to receive a plurality of primary stool specimen containers 104, and at least one but preferably a plurality of secondary loading modules 106, each configured to receive a plurality of secondary fecal sample extraction tubes 108. Specimen containers 104 and extraction tubes 108 can be loaded into corresponding modules 102/106 manually or through a robotic module. In preferred embodiments, each module 104/106 slides into the system 100 via a sliding track 112/114 that slides the modules 104/106 through a front door 110 for loading. Thus one having ordinary skill in the art to which the invention belongs would understand that the dimensions of modules 104/108 can vary depending on the particular primary stool specimen containers 104 and fecal extraction tubes 108 used and that the tracks 112/114 sliding action can be accomplished manually or by motor. Moreover, as will be described in more detail in paragraphs below, by providing a plurality of primary loading modules 102 and a plurality of secondary loading modules 106 together with software, the system 100 permits operating technicians or further robotic modules to continually feed the system 100 with primary stool containers 104 and secondary extraction tubes 108, even during operation.

As will become evident, the primary stool specimen container 104 is preloaded with stool, such as from a subject in need of testing so that the technician loading the primary stool collection container 104 into the system 100 is not at risk of exposure. Moreover, after the extraction step, the technician is also able to retrieve the fecal sample extraction tube 108 without risk of exposure.

Figure 3:
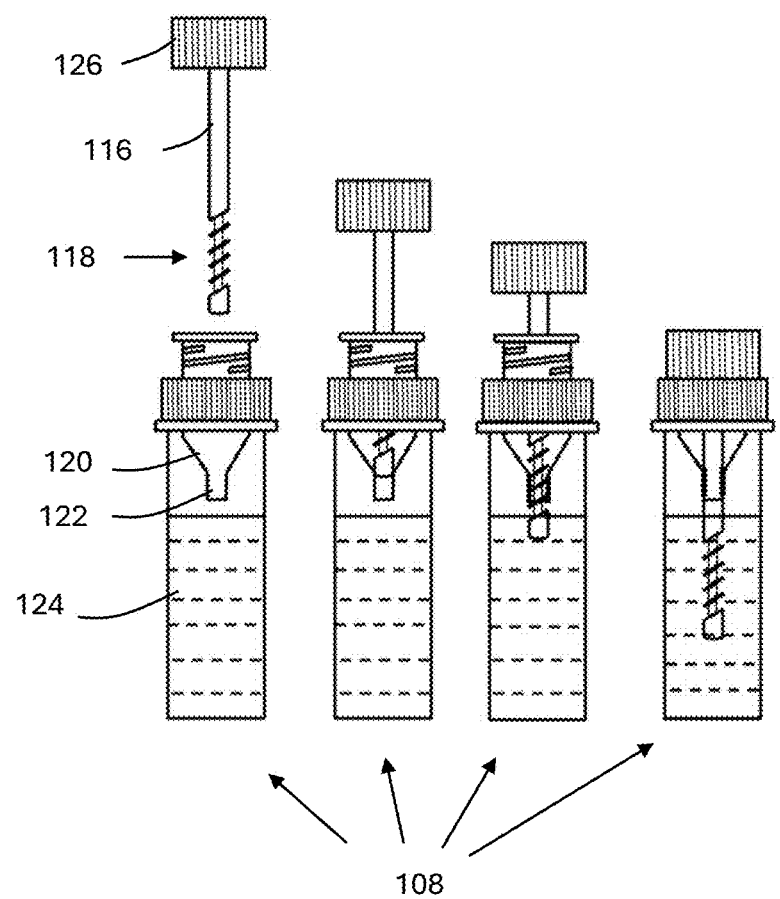
FIG. 3 depicts an exemplary fecal sample extraction tube for use in the system.

The preferred fecal sample extraction tubes 108 are those substantially as provided in U.S. Pat. No. 11,293,839 by Gao, which is incorporated herein by reference in its entirety. FIG. 3 provides an overview of the Gao technology where the fecal sample extraction tube 108 includes a collection wand 116 and a mechanism for quantitatively extracting a fecal sample from a stool loaded wand 116. In particular, in FIG. 3 the fecal sample extraction tube 108 quantitatively extracts a fecal sample from a stool-loaded wand 116 by configuring the wand 116 with grooves 118 able to load stool and provides a tight-fitting elastic sealing funnel 120 with stem 122 so that as the stool-loaded wand 116 is inserted into the extraction tube 108, feces outside of the grooves 118 is wiped away by the tight fit of the stem 122. The result is that feces filling the volume of the grooves 118 is selectively delivered into solubilizing solution 124 while feces outside of the grooves 118 is substantially prevented from accessing the solution 124. On having ordinary skill in the art to which the invention belongs would understand that while the configuration shown in FIG. 3 is certainly usable for the system 100, there can also be other variations to the fecal sample extraction tube 108 that can be used. For example, while the wand 116 in FIG. 3 is grooved 118, alternative stool-loading structures can also be used such as various cutaways, slits, or through bores able to load stool. Each would also benefit from the technical approach of wiping away excess feces. Moreover, the configuration in FIG. 3 shows a collection wand 116 that is integral to a screw cap 126 however, other configurations are also acceptable, such as those where a wand 116 is held upright within the extraction tube 108 so that it can be accessed after opening the extraction tube 108. Thus, the features shown, even if preferred, but not required in the broadest claim should be considered as optional embodiments.

As shown collectively throughout the drawings, the system 100 includes a robotic arm 128 able to interact with the plurality of stool specimen containers 104 and fecal sample extraction tubes 108. The robotic arm 128 is communicatively coupled to a central processing unit 130 or "CPU" 130 (see FIG. 2) or at least a microcontroller and can move in at least three directions, namely, side to side, front to back, and up and down along conventional cartesian coordinates as known in the robotic arts. Best shown in FIG. 5, the robotic arm 128 may also include a grabber 132 able to open and close to grab and release a selected extraction tube 108. In configurations where the stool specimen container 104 and/or fecal sample extraction tube 108 has a screw cap 126, the grabber 132 can be configured to rotate clockwise and counterclockwise to unscrew and unscrew the container/tube cap 126 and can be configured to pivot to angle the grabber 132 one way or another. In configurations where the stool specimen container 104 and/or fecal sample extraction tube 108 has either a sliding top 134 or a flip top, the grabber 132 may have a finger 136 portion to flip or slide the top 134 (see FIG. 4). Each of these variations can be programmed into the CPU 130 using programming well-known in the robotic arts.

Figure 10:
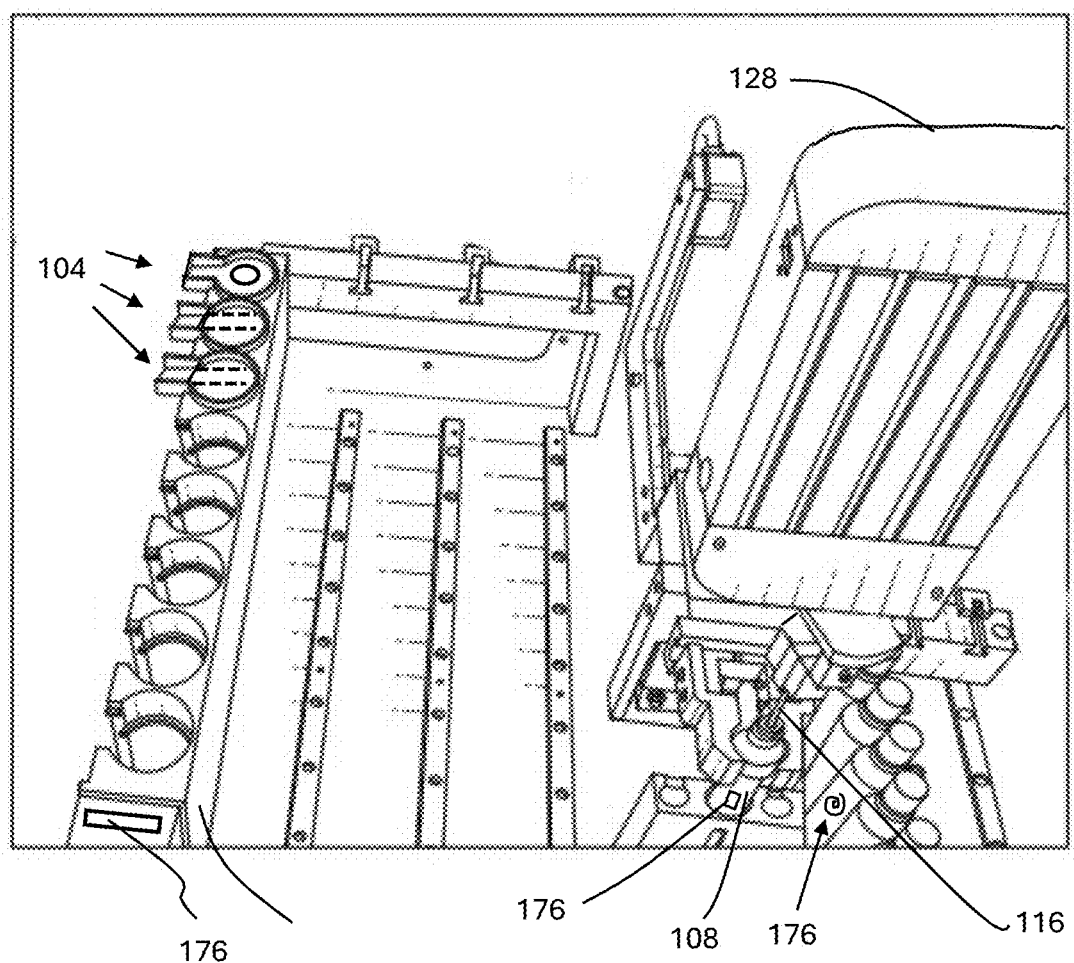
FIG. 10 depicts the robotic arm inserting the stool-loaded wand into fecal sample extraction tube.

As an overview, after loading the plurality of specimen containers 104 and extraction tubes 108 into the system 100, the robotic arm 128 can open a first primary stool specimen container 104 (see FIG. 4), retrieve a collection wand 116 from a selected extraction tube 108 (see FIG. 6), insert the retrieved collection wand 116 into the stool to load the wand 116 with stool (see FIG. 7), and insert the stool-loaded collection wand 116 into the selected extraction tube 108 to extract the fecal sample (see FIG. 10).

One having ordinary skill in the art would appreciate that both the plurality of specimen containers 104 and extraction tubes 108 may remain in their corresponding primary and secondary loading modules 102/106 throughout the entire process in instances where they can be sufficiently secured during the collection and/or extraction methods, but in embodiments where additional securing is needed or preferred during the collection and/or extraction methods, they can be transferred to another location during the process to more firmly secure the container 104 or tube 108 as needed.

Figure 4:
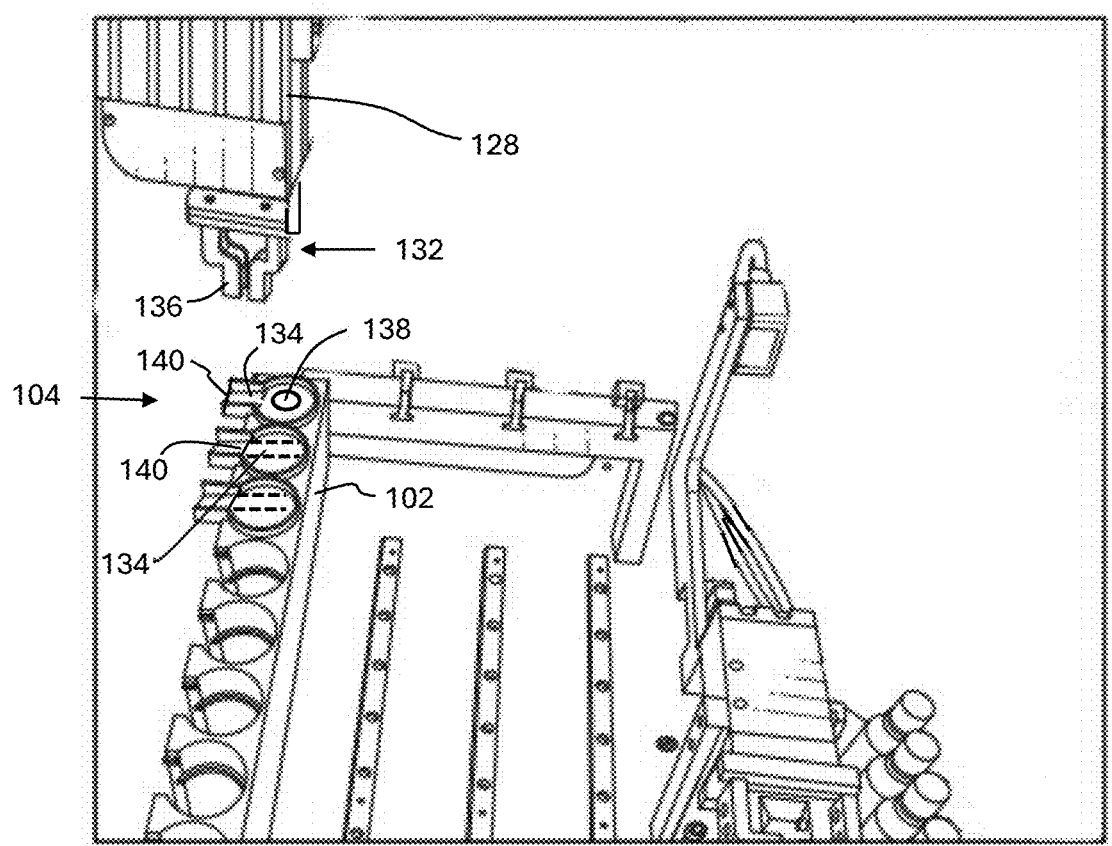
FIG. 4 depicts an exemplary opening of a selected primary stool specimen container.
Figure 5:
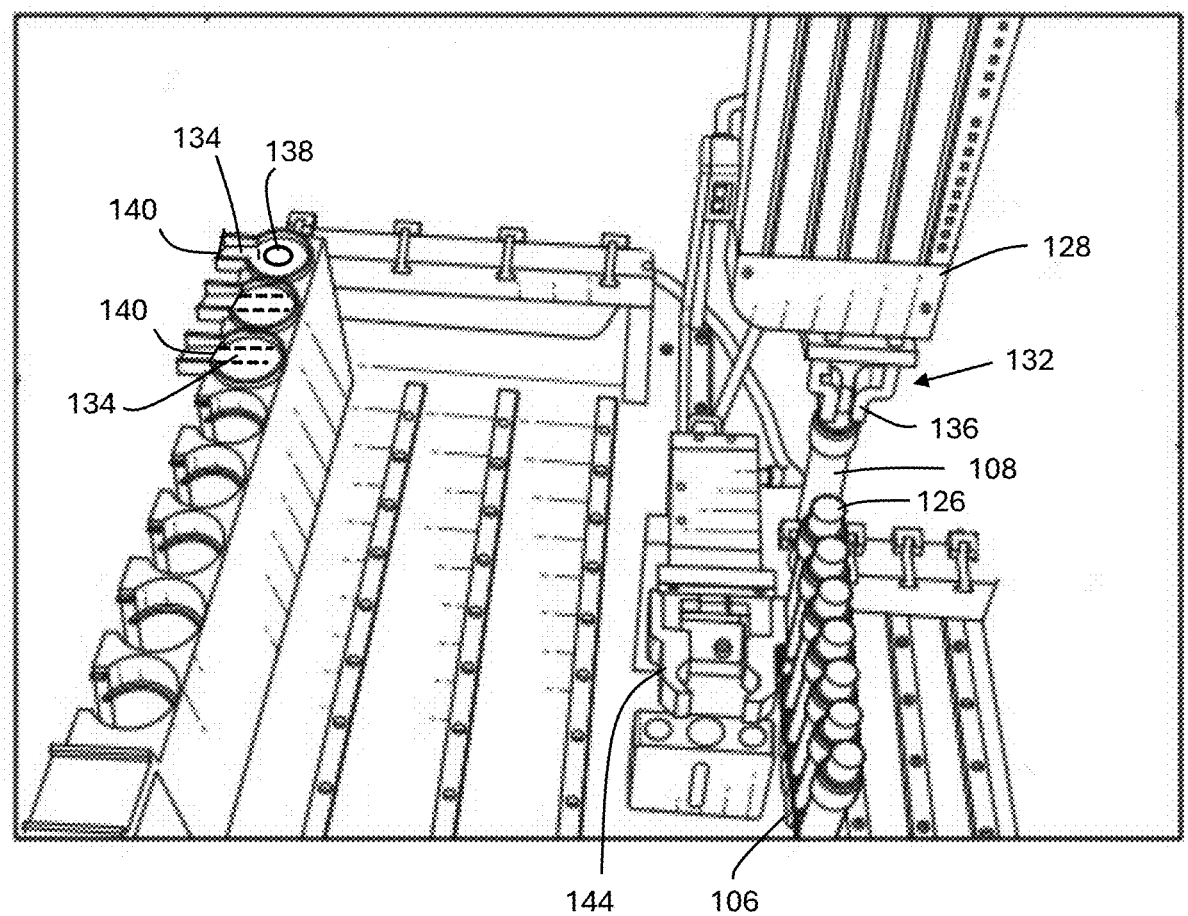
FIG. 5 depicts the selection of a fecal extraction tube using the robotic arm and its transfer to an operational spot.
Figure 6:
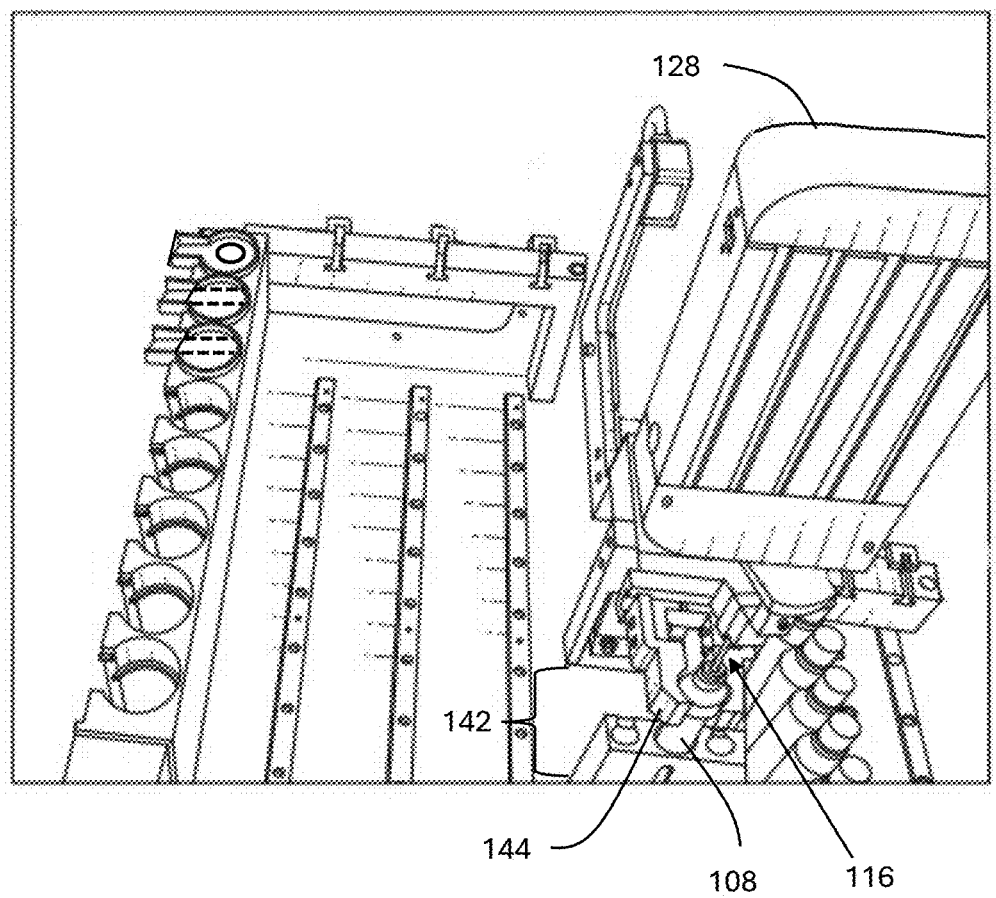
FIG. 6 depicts the robotic arm retrieving the collection wand from a selected extraction tube.

As a nonlimiting example of the above, FIG. 4 provides a configuration where the stool specimen container 104 opens via a slidable cap 134 to permit access to the stool. More specifically, a cap 134, which covers an access aperture 138 sized significantly larger than the diameter of the wand 116, is exposed by sliding a lip 140 using the finger 136 of the grabber 132. Here, the operation can be conducted at the primary loading module 102 due to the significant difference in size between the aperture 138 and wand 116 (see also FIG. 7) and because the sliding motion at worst pushes the container 104 laterally only slightly against the side of the primary loading module 102. In contrast, FIGS. 5-6 depict that before retrieving the wand 116 from the fecal sample extraction tube 108, a selected fecal sample extraction tube 108 can be moved from the secondary loading module 106 to an operational spot 142. The designation of an operational spot 142 was found to have substantial benefits. A first benefit is that the operational spot 142 can be configured with a gripper 144 to securely hold the extraction tube while retrieving the wand 116 in instances where the extraction tube 108 has a screw cap 126. Similarly, as shown in FIG. 10, the gripper 144 can securely hold the extraction tube 108 as the stool-loaded wand 116 is inserted into the extraction tube 108 to ensure proper alignment. Another benefit is that by designating an operational spot 142, movement of a stool-loaded wand 116 could be minimized, which itself minimizes risk of feces falling from the stool-loaded wand 116 during transport. Further benefits will become evident in view of the following disclosure.

However, returning to FIG. 4, the robotic arm 128 opens the specimen collection container 104 to permit access to the collected stool. Moving on to FIGS. 5-6, a secondary fecal sample extraction tube 108 is selected and can be moved from the secondary loading module 106 to an operational spot 142 using the arm 128, where the gripper 144 closes to firmly hold the selected extraction tube 108. The robotic arm 128 retrieves the collection wand 116 from the selected extraction tube 108 according to the characteristics of the extraction tube 108 itself, such as unscrewing a cap 126 with integrated wand 116.

Figure 7:
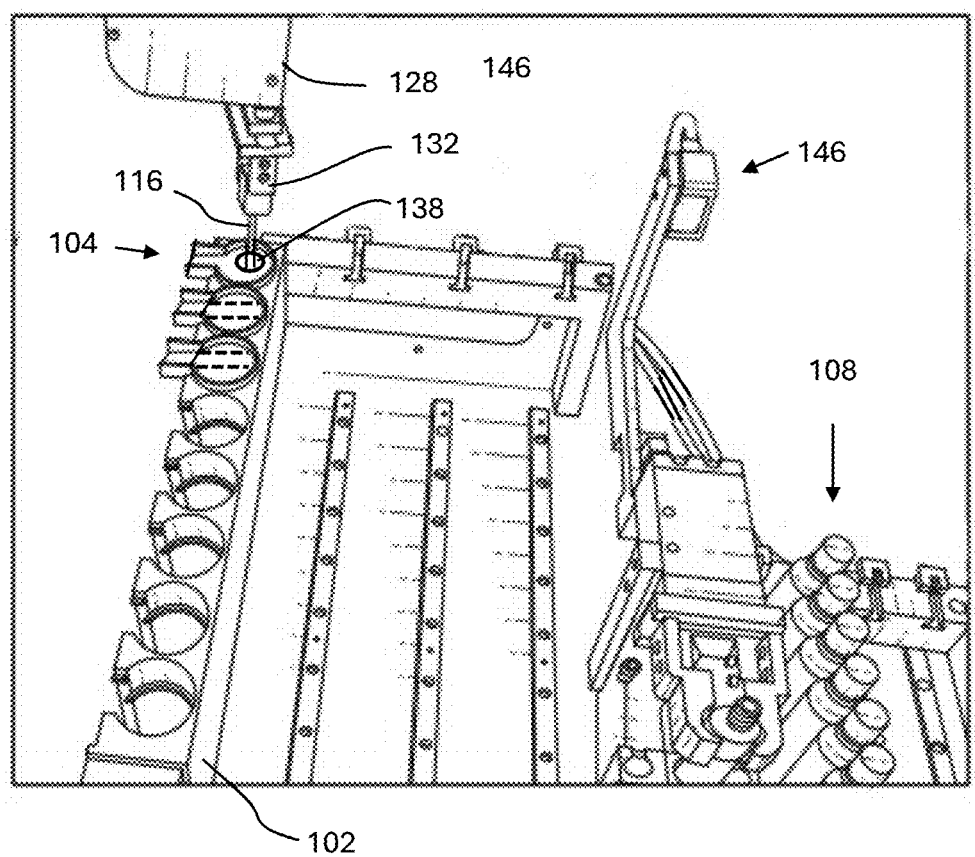
FIG. 7 depicts the robotic arm loading the collection wand from the primary stool collection container.

Continuing to FIG. 7, the arm 128 inserts the retrieved collection wand 116 into the stool to load the wand 116 with stool. Loading can be accomplished using different approaches. In some approaches the wand 116 is inserted to a preprogramed depth while rotating, which results in a downward spiral movement, which has been found to be the preferred approach for a wand 116 with spiral groove 118 (see FIG. 3). However, in other embodiments, an orbital movement is performed either as the wand 116 is moved downward or after reaching its bottom position. In still other embodiments, the wand 116 is simply moved downward the upward one or more times.

While the above-described approaches utilize a preprogrammed depth based on known dimensions of the primary specimen container 104, in other embodiments the same movements can be performed until a sufficient force is applied against the wand 116. In some embodiments, the sufficient force can be applied when the wand 116 contacts a portion of the container 104. In other embodiments, the sufficient force can be applied by the stool specimen itself. In each of the above, the force can be determined using a force gauge that determines applied force, such as by assessing the retracting distance of the grabber 132 into the arm 128 in response to applied force.

Figure 8:
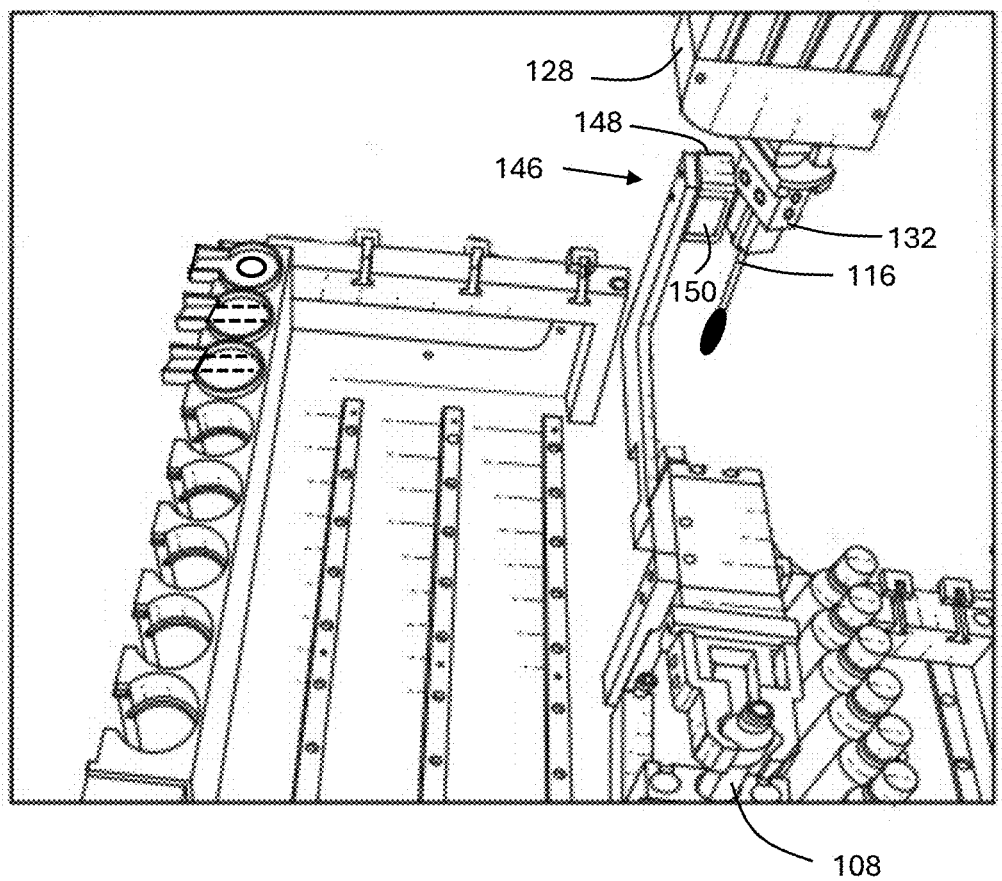
FIG. 8 depicts the robotic arm positioning the stool-loaded wand in view of a camera for analyzing the stool load.
Figure 9:
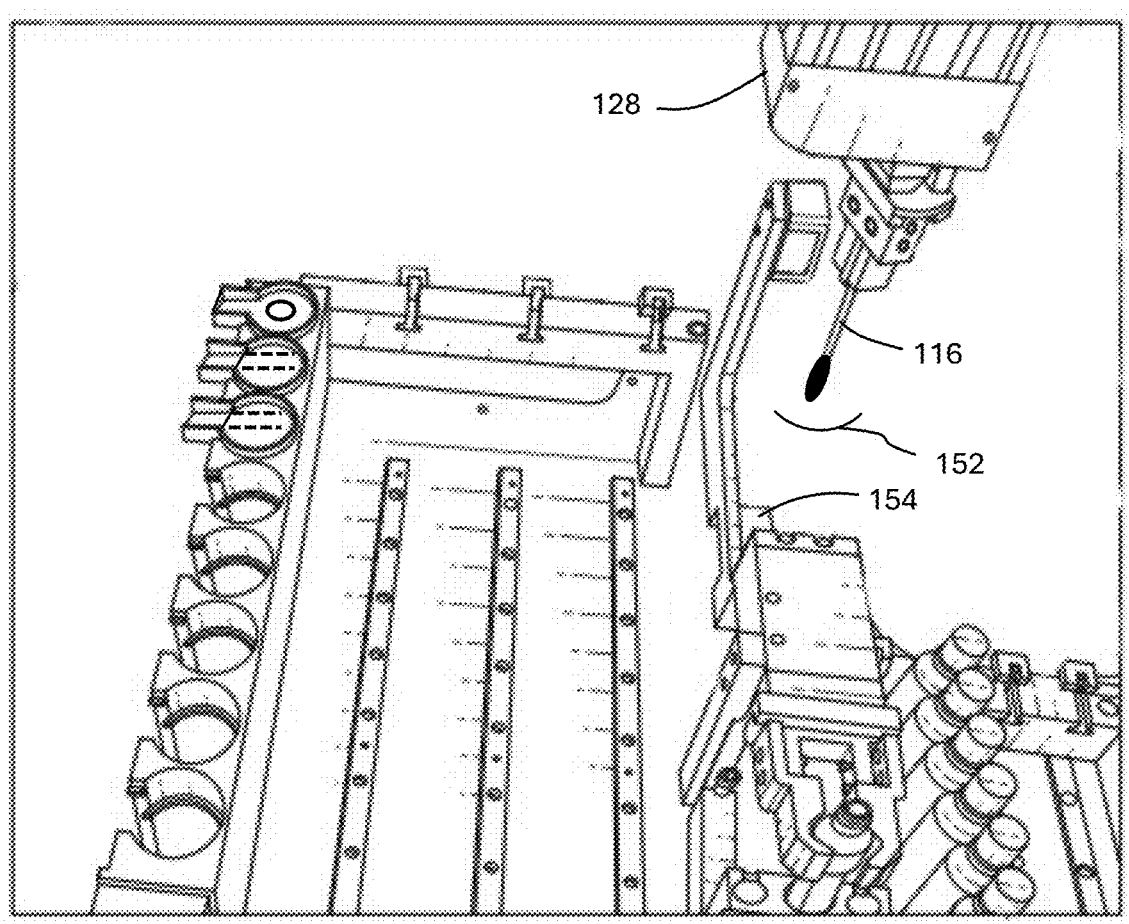
FIG. 9 depicts the robotic arm positioning the wand in view of a sensor to analyze the pitch and position of the collection wand for subsequent insertion into the selected extraction tube.

Moving on to FIGS. 8-9, a quality control module 146 assesses and confirms whether the loading of the collection wand 116 meets a preset acceptable tolerance and if so, the quality control module 146 assists with positioning of the robotic arm 128 for accurate insertion of the stool loaded wand 116 into the selected extraction tube 108 (see also FIG. 10). The quality control module 146 operates using an analyzer 148 in combination with feedback mechanism, which can be software provided in the analyzer 148 or CPU 130 (see also FIG. 2).

In some embodiments, the analyzer 148 includes a camera 150 and an image detection system (e.g. executable software loaded in the analyzer 148) which together view or capture an image, and subsequently or in real-time, analyze the viewed/captured image. For example, as shown in FIG. 8, the arm 128 moves the stool-loaded wand 116 into the viewing area of the camera 150 to permit viewing or capture and analysis of the stool load. During image viewing or capture the arm 128 can hold the stool-loaded wand 116 statically or can rotate the stool-loaded wand 116 about 180 degrees, 360 degrees or more for more complete viewing around the entirety of the wand 116. The subsequent or real-time analysis can be performed using different approaches.

In one analysis approach, the stool load is assessed by detecting whether or not the wand 116 can be viewed through the loaded stool. In other words, the stool load is analyzed to determine whether or not the wand 116 is sufficiently covered, thereby masking the wand 116 itself. When the wand 116 cannot be viewed through the stool, the stool load meets a preset acceptable tolerance for amount and consistency, but if the wand 116 can be viewed, the tolerance is not met.

In another analysis approach, the added width due to the stool load can be compared to a preset acceptable tolerance. Broadly, a width that is equal to or preferably greater than the width of the wand 116 would be considered an acceptable amount and consistency in instances where stool is captured into grooves 118 (see also FIG. 3), cutaways, slits, or through bores because stool outside of the grooves 118, cutaways, slits, or through bores would be excess and wiped away.

In still another analysis approach, the stool-loaded wand 116 is analyzed for unfilled grooves 118, gaps, or recesses. Fully filled grooves 118, gaps or recesses would pass the preset acceptable tolerance for amount and consistency, however unfilled grooves 118, gaps, or recesses would not.

While the above analysis approaches are primarily discussed regarding a camera 150 approach, an analyzer 148 in the form of a laser and photodetector could also be used to perform substantially the same approaches by positioning the stool within the target area of the laser and analyzing the detected presence, absence or thickness of the stool load.

In some embodiments, when the preset acceptable tolerance is not sufficient to continue, the quantitative collection and extraction of the specimen is aborted or suspended. The technician can be notified by an alarm such as an audio alarm or visual alarm and/or the particular specimen collection container can be flagged in a report.

In other embodiments, when the preset acceptable tolerance is not sufficient to continue, the system returns to load additional stool by substantially repeating the loading procedure and quality control steps. The number of repetitions can be preset and summarized in one or more reports.

Once the preset tolerance for amount and consistency is met, the arm 128 inserts the stool-loaded wand 116 into the extraction tube 108 (see FIG. 10). However, further quality control improvements have also been developed to improve accuracy when inserting the stool-loaded wand 116 into the extraction tube 108. In particular, during wand 116 retrieval and sample loading steps, in some instances, the stool-loaded wand 116 can shift in position. Yet, when using a configuration such as an elastic funnel 120 with tight fitting stem 122, alignment with the wand 116 can be crucial for proper insertion. Accordingly, as shown in FIG. 9, the pitch and/or offset positioning 152 of the wand 116 can be analyzed and through a feedback mechanism (e.g. programming), supplemental instructions can be provided to modify the positioning of the robotic arm 128 for accurate insertion of the stool-loaded wand 116 into the selected extraction tube 108. Examples of changes can be increased or decreased movements to the left, right, forward or backward positioning of the grabber 132 consistent with conventional cartesian coordinate positioning and/or change in tilt of the grabber 132 to angle the stool-loaded wand 116 more or less one way or another.

A nonlimiting example of determining the pitch or offset positioning 152 is shown in FIG. 9, where an optical sensor 154 (e.g. camera or laser) senses the position and pitch of the wand 116. The position and pitch are compared with the preset desired position and pitch using the CPU 130 (see also FIG. 2), and supplemental instructions for a position adjustment is transferred to the arm 128.

Moving on to FIG. 10, the stool-loaded wand 116 is inserted into the fecal sample extraction tube 108, then the tube 108 is capped and returned to the secondary loading module 106 (see also FIG. 5). The procedure can be repeated with a new fecal sample extraction tube 108 and the same or different primary stool specimen container 104 as desired. At any step after capping the tube 108, the tube 108 can be mixed by vigorous shaking.

Once extraction is complete, a fixed volume of sample can be removed from the secondary extraction tube as needed for quantitative analysis, such as using enzyme-linked immunosorbent assay (ELISA) or other immunoassay, an immunochemical or colorimetric assay, optical detection, and others. Specimen removal can be manual or automated.

Now referring to FIGS. 1-10 collectively, among the challenges that remained with the development of the automated system 100 for quantitative collection and extraction of a fecal sample, included the presence of a foul odor. In particular, as throughput increased, more and more primary stool specimen containers 104 and stool-loaded wands 116 were exposed inside the system 100. Thus, even though the technician could walk away as stool was processed, repeated use of the system 100 involved opening and closing the door 110, which allowed the odor to escape.

Figure 2:
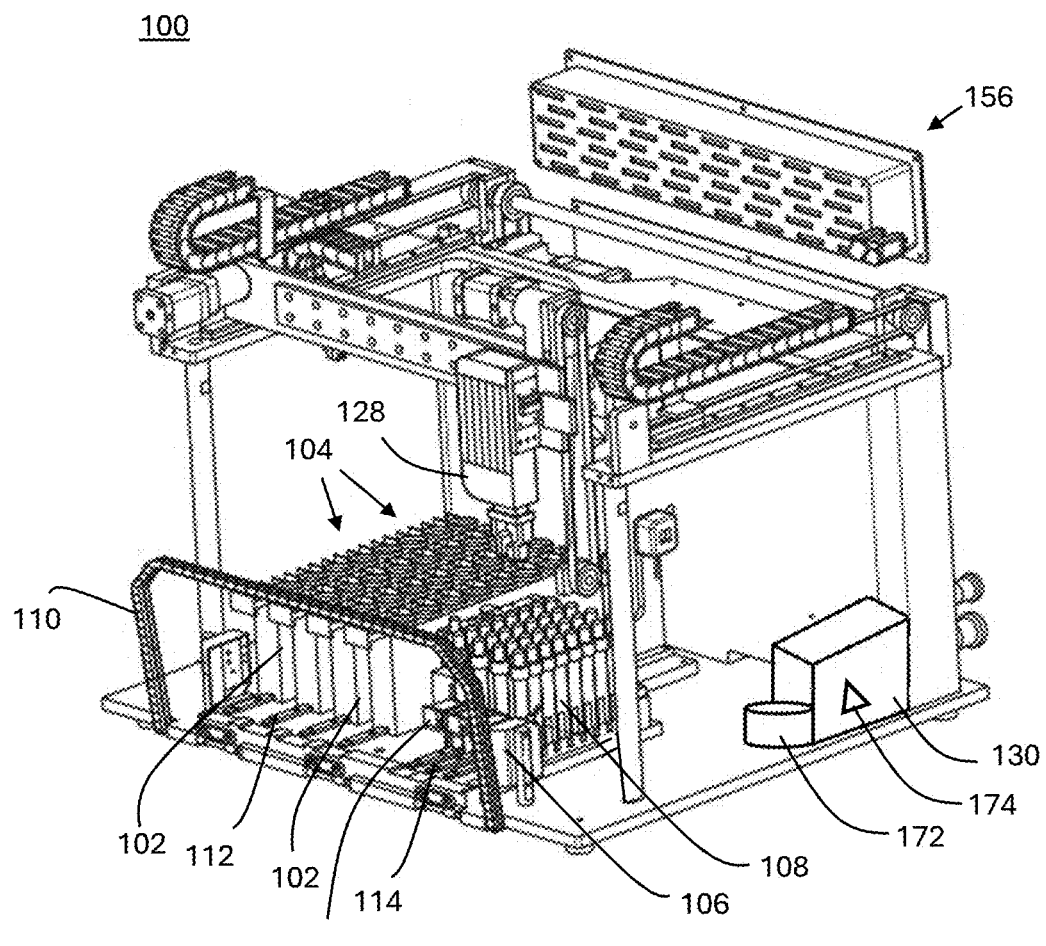
FIG. 2 depicts features inside the automated system shown in FIG. 1.
Figure 11:
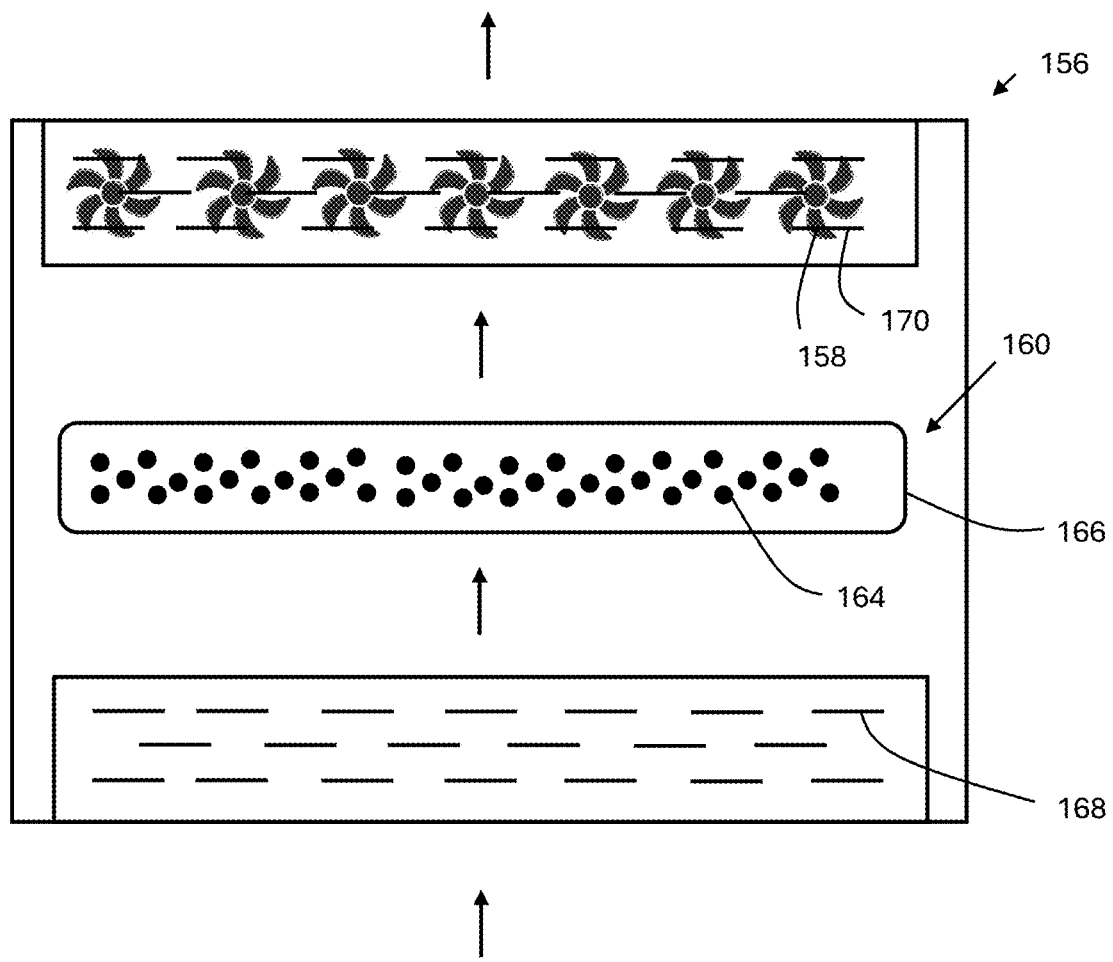
FIG. 11 is a schematic demonstrating the path of airflow through the exhaust module.

Now with reference to FIGS. 1-2 and 11 collectively, the above challenges were further addressed though the development of an exhaust module 156, which includes a fan 158 and odor filter 160. Further, shown better in FIG. 1, an air inlet 162 was also developed to coordinate with the exhaust module 156 to generate airflow through the system 100 and the odor filter 160. In some embodiments, the air inlet 162 is configured to selectively remain open while the fan 158 is operated, but in other embodiments the fan 158 is configured to selectively operate while the air inlet 162 remains open. The air inlet 162 is closed when the fan 158 is not operating. Thus, preferably the air inlet 162 and exhaust module 156 coordinate with each other to create a mini-air flow within the system 100 to transport the odor to the filter 160 but substantially prevent odor escape by selectively pairing the opening of the air inlet 162 with the operation of the fan 158. This can be further improved by positioning the exhaust module 156 and air inlet 162 at generally opposing ends of the system 100, such as at generally the top and bottom regions of the system, to ensure mini-air flow within the system 100. Moreover, the exhaust module 156 may continue to run after completing transfer of the stool to the fecal sample extraction tubes 108 to clear any residual odor prior to releasing a lock at the access door 110.

Focusing on FIG. 11, the odor filter 160 includes a filter media 164, which can be held in a cartridge 166 between air access slits 168 and the fan 158. Examples of suitable filter media 164 include activated charcoal, baking soda, polyethylene terephthalate (PET), volcanic ash, and chemically treated fabrics. Thus, exemplary operation is depicted in FIG. 11, where air from within the system 100 is drawn through air access slits 168, then the filter media 164 and eventually out of exhaust vents 170.

Returning to FIG. 2, recordkeeping and tracking within the system 100 is performed using executable software in the CPU 130 and in communication with a database 172 that pairs the primary fecal sample container 104 with a corresponding secondary extraction tube(s) 108. In some embodiments, the executable software also has a random generator 174 to randomly pair one or more of the plurality of extraction tubes 108 to one or more of the plurality of primary fecal sample containers 104.

The use of a random generator 174 has been further advanced in the system 100 to provide random access capability. By "random access capability" it is meant that the system 100 can process specimens in any order. As such, the system 100 can access an arbitrary specimen collection container 104 and/or fecal extraction tube 108, roughly as easy as any other. This flexibility enhances throughput by permitting an operator or further robotic module to continue to feed new primary specimen containers 104 and secondary extraction tubes 108 into the system, while also removing those that have already completed the extraction cycle.

Shown best in FIG. 10, tracking across multiple samples can be performed using identifiers 176 on one or more selected from a) the primary loading module 102, b) the secondary loading module 106, c) each of the plurality of primary fecal sample containers 104, and d) each of the plurality of secondary extraction tubes 108. Exemplary identifiers 176 can be a barcode, a radio frequency identification (RFID) tag, a near field communication (NFC) tag, a mixture of two or more, and others. In some embodiments, the system 100 includes a reader or scanner that reads the identifiers 176 as they enter and/or exit the system 100.

The system 100 preferably includes software loaded into memory that integrates with laboratory information systems to track the processing of specimens, generate reports, and upload reports in real-time to the laboratory's system. This helps manage test workflows and reduces manual data entry. Preferably the system includes data encryption and secure storage for sample and test results to ensure confidentiality of patient data.

The invention described in the above exemplary embodiments, may be combined in any suitable way and even embodied in other specific forms without departing from the spirit or essential characteristics thereof. The specific embodiments previously described are therefor to be considered as illustrative of, and not limiting, the scope of the invention.

As such, referring to FIGS. 1-11 collectively, an exemplary automated system 100 for quantitative collection and extraction of a fecal sample, can include: a primary loading module 102 configured to receive a plurality of primary stool specimen containers 104, each container 104 configured to house a stool specimen, and a secondary loading module 106 configured to receive a plurality of secondary extraction tubes 108, each tube 108 having a collection wand 116 integrated into a cap 126 and configured to quantitatively extract a fecal sample from a stool loaded wand 116, a robotic arm 128 configured to: open and close a selected primary fecal sample container 104, move a selected extraction tube 108 from the secondary loading module 106 to an operational spot 142, open the cap 126 and retrieve the collection wand 116 from the selected extraction tube 108, insert the retrieved collection wand 116 into the stool using a downward spiral maneuver to load the wand 116 with stool, and insert the loaded collection wand 116 into the individual extraction tube 108 to extract the fecal sample; a quality control module 146 having a camera 150 and image detection system with feedback mechanism in communication with the robotic arm 128 that is configured to assess and confirm whether loading of the collection wand 116 meets a preset acceptable tolerance and if so, the quality control module 146 assists with positioning of the robotic arm 128 for accurate insertion of the stool loaded wand 116 into the selected extraction tube 108, but if not, the system 100 is configured to reload the wand 116; an exhaust module 156 having a fan 158 and odor filter 160 that removes odor from the system 100, the system 100 further having an air inlet 162 that coordinates with the exhaust module 156 to generate air flow through the system 100 and the odor filter 160, and executable software loaded into the system 100 and in communication with a database 172 that randomly generates and assigns pairs between the primary fecal sample container 104 and at least one of the plurality of secondary extraction tube(s) 108.

As will become evident to one having ordinary skill in the art, methods for quantitative collection and extraction of a fecal sample require minimal operation by the technician/operator. In particular, the technician/operator adds a stool specimen container 104 that contains stool to the system 100; then the system 100 through its automation, opens a selected primary stool specimen container 104, selectively retrieves a collection wand 108 from an extraction tube 108, inserts the retrieved collection wand 116 into the stool to load the wand 116 with stool, assesses and confirms whether loading of the collection wand 116 meets a preset acceptable tolerance and if so, the system 100 inserts the loaded collection wand 116 into the selected extraction tube 108 to extract the fecal sample; and the collection/extraction steps are repeated as desired. The specimen container 104 can be closed. When completed, the technician/operator retrieves the plurality of extraction tubes 108 having the extracted fecal sample for conducting the desired quantitative fecal sample assay(s).

What is claimed is:

1. An automated system for quantitative collection and extraction of a fecal sample, the system comprising:
    a. a plurality of primary stool specimen containers, each configured to house a stool specimen, and a plurality of secondary extraction tubes, each having a collection wand and configured to quantitatively extract a fecal sample from a stool loaded wand;
    b. a primary loading module configured to receive the plurality of primary stool specimen containers, and a secondary loading module configured to receive the plurality of secondary extraction tubes;
    c. a robotic arm configured to:
        i. open and close a selected primary stool specimen container,
        ii. selectively retrieve the collection wand from each of the plurality of extraction tubes,
        iii. insert the retrieved collection wand into the stool to load the wand with stool, and
        iv. insert the loaded collection wand into a selected extraction tube to extract the fecal sample;
    d. a quality control module comprising an analyzer with feedback mechanism in communication with the robotic arm that is configured to assess and confirm whether loading of the collection wand meets a preset acceptable tolerance and if so, the quality control module assists with positioning of the robotic arm for accurate insertion of the stool loaded wand into the selected extraction tube;
    e. an exhaust module comprising a fan and odor filter that removes odor from the system, the system further comprising an air inlet that coordinates with the exhaust module to generate air flow through the system and the odor filter; and
    f. executable software loaded into the system and in communication with a database that pairs at least one of the primary stool specimen containers with a corresponding secondary extraction tube(s).

2. The automated system of claim 1, wherein each collection wand is integrated into an extraction tube cap.

3. The automated system of claim 1, wherein the robotic arm is configured to move the selected extraction tube from the secondary loading module to an operational spot prior to retrieving the collection wand.

4. The automated system of claim 1, wherein each wand comprises cutouts or grooves and the plurality of secondary extraction tubes are configured to selectively accept the fecal sample from within the cutouts or grooves.

5. The automated system of claim 1, wherein the robotic arm is configured to load the wand using a downward spiral maneuver.

6. The automated system of claim 1, wherein the acceptable tolerance is a sufficient amount of loaded stool and optionally a sufficient consistency of loaded stool.

7. The automated system of claim 6, wherein the system is configured to generate a warning signal and/or reload the wand if the quality control module does not confirm that the loading of the collection wand meets the acceptable tolerance.

8. The automated system of claim 1, wherein the quality control module determines pitch or an offset position of the stool loaded wand and if outside of a preset tolerance, instructs an adjustment or modification of pitch or offset position to the robotic arm for the accurate insertion into the extraction tube.

9. The automated system of claim 1, wherein the analyzer comprises a camera and image detection system.

10. The automated system of claim 1, wherein the analyzer comprises a laser and photodetector.

11. The automated system of claim 1, wherein the odor filter comprises a material selected from the group consisting of activated charcoal, baking soda, polyethylene terephthalate (PET), volcanic ash, and chemically treated fabrics.

12. The automated system of claim 1, wherein the air inlet is configured to selectively remain open while the fan is operated, or the fan is configured to selectively operate while the air inlet remains open; wherein the position of the air inlet and exhaust module coordinate with each other to create a mini-air flow within the system to transport the odor to the filter.

13. The automated system of claim 1, wherein the executable software further comprises a random generator to randomly pair one or more of the plurality of extraction tubes to one or more of the plurality of primary stool specimen containers.

14. The automated system of claim 13, wherein the system is configured to permit loading of additional primary and secondary loading modules while the robotic arm is transferring stool to extraction tube(s).

15. The automated system of claim 1, wherein one or more of the primary loading module, the secondary loading module, each of the plurality of primary stool specimen containers, and each of the plurality of secondary extraction tubes is labeled with a distinct identifier.

16. The automated system of claim 15, wherein the identifier is a barcode, a radio frequency identification (RFID) tag, and a near field communication (NFC) tag.

17. A method for quantitative collection and extraction of a fecal sample, the method comprising: providing the system of claim 1; adding a fecal sample container that contains stool to the system; and retrieving one or more extraction tubes comprising an extracted fecal sample.

18. An automated system for quantitative collection and extraction of a fecal sample, the system comprising:
   a. a plurality of primary stool specimen containers configured to house a stool specimen and a plurality of secondary extraction tubes having a collection wand integrated into a cap and configured to quantitatively extract a fecal sample from a stool loaded wand;
   b. a primary loading module configured to receive the plurality of primary stool specimen containers, and a secondary loading module configured to receive the plurality of secondary extraction tubes;
   c. a robotic arm configured to:
      i. open and close a selected primary stool specimen container,
      ii. move a selected extraction tube from the secondary loading module to an operational spot,
      iii. open the cap and retrieve the collection wand from the selected extraction tube,
      iv. insert the retrieved collection wand into the stool using a downward spiral maneuver to load the wand with stool, and
      v. insert the loaded collection wand into the individual extraction tube to extract the fecal sample;
   d. a quality control module comprising a camera and image detection system with feedback mechanism in communication with the robotic arm that is configured to assess and confirm whether loading of the collection wand meets a preset acceptable tolerance and if so, the quality control module assists with positioning of the robotic arm for accurate insertion of the stool loaded wand into the selected extraction tube, but if not, the system is configured to reload the wand;
   e. an exhaust module comprising a fan and odor filter that removes odor from the system, the system further comprising an air inlet that coordinates with the exhaust module to generate air flow through the system and the odor filter; and
   f. executable software loaded into the system and in communication with a database that randomly generates and assigns pairs between at least one of the primary stool specimen containers and at least one of the plurality of secondary extraction tube(s).

19. A method for quantitative collection and extraction of a fecal sample, the method comprising: providing the system of claim 18; adding a fecal sample container that contains stool to the system; and retrieving one or more extraction tubes comprising an extracted fecal sample.

20. An automated system for quantitative collection of a fecal sample from a primary stool specimen container and extraction of the collected fecal sample with a secondary extraction tube having a collection wand and configured to quantitatively extract a fecal sample from a stool loaded wand, the automated system comprising:
   a. a plurality of primary stool specimen containers, each configured to house a stool specimen, and a plurality of secondary extraction tubes, each having a collection wand and configured to quantitatively extract a fecal sample from a stool loaded wand;
   b. a primary loading module configured to receive the plurality of primary stool specimen containers, and a secondary loading module configured to receive the plurality of secondary extraction tubes;
   c. a robotic arm configured to:
      i. open and close a selected primary stool specimen container,
      ii. selectively retrieve the collection wand from each of the plurality of extraction tubes,
      iii. insert the retrieved collection wand into the stool to load the wand with stool, and
      iv. insert the loaded collection wand into a selected extraction tube to extract the fecal sample;
   d. a quality control module comprising an analyzer with feedback mechanism in communication with the robotic arm that is configured to assess and confirm whether loading of the collection wand meets a preset acceptable tolerance and if so, the quality control system assists with positioning of the robotic arm for accurate insertion of the stool loaded wand into the selected extraction tube; and
e. executable software loaded into the system and in communication with a database that pairs at least one of the primary stool specimen containers with a corresponding secondary extraction tube(s).

\* \* \* \* \*